United States Patent
Tanimura et al.

(10) Patent No.: US 7,111,609 B2
(45) Date of Patent: Sep. 26, 2006

(54) INTAKE AIR CONTROL DEVICE HAVING STRAIN ABSORBING STRUCTURE

(75) Inventors: Hiroshi Tanimura, Kariya (JP); Shin Iwaoka, Kariya (JP); Hiroki Shimada, Obu (JP); Tsuyoshi Arai, Kariya (JP); Naoki Hiraiwa, Toyokawa (JP)

(73) Assignee: Denso Corporation, (JP)

( * ) Notice: Subject to any disclaimer, the term of this patent is extended or adjusted under 35 U.S.C. 154(b) by 0 days.

(21) Appl. No.: 11/137,791

(22) Filed: May 26, 2005

(65) Prior Publication Data

US 2005/0263131 A1 Dec. 1, 2005

(30) Foreign Application Priority Data

May 27, 2004 (JP) .............................. 2004-157956
Dec. 28, 2004 (JP) .............................. 2004-380819

(51) Int. Cl.
*F02D 11/10* (2006.01)
*F02M 35/10* (2006.01)

(52) U.S. Cl. ...................................... 123/337; 123/399

(58) Field of Classification Search ................ 123/336, 123/337, 361, 399; 251/305
See application file for complete search history.

(56) References Cited

U.S. PATENT DOCUMENTS 5,988,131 A * 11/1999 Hernandez et al. ......... 123/337

FOREIGN PATENT DOCUMENTS

| JP | 10-280981 | 10/1998 |
| JP | 11-013562 | 1/1999 |
| JP | 11-062739 | 3/1999 |

* cited by examiner

*Primary Examiner*—T. M. Argenbright
(74) *Attorney, Agent, or Firm*—Nixon & Vanderhye PC

(57) ABSTRACT

An intake air control device, which is mounted to a fixed member, includes a throttle body and a throttle valve. The throttle body defines an intake air passage. The throttle valve is rotatably supported in the throttle body to control an amount of intake air flowing through the intake air passage. The throttle body includes a cylindrical portion, a plurality of fixed portions, and a strain absorbing portion. The cylindrical portion defines the intake air passage that accommodates the throttle valve. The plurality of fixed portions are connected to the fixed member. The strain absorbing portion connects the cylindrical portion with the plurality of fixed portions to absorb displacement arising in the plurality of fixed portions. The strain absorbing portion is a deformable connecting arm that connects to the cylindrical portion in a location, which is apart from a radially inner periphery of the plurality of fixed portions.

9 Claims, 8 Drawing Sheets

INTAKE AIR CONTROL DEVICE HAVING STRAIN ABSORBING STRUCTURE

CROSS REFERENCE TO RELATED APPLICATIONS

This application is based on and incorporates herein by reference Japanese Patent Applications No. 2004-157956 filed on May 27, 2004 and No. 2004-380819 filed on Dec. 28, 2004.

FIELD OF THE INVENTION

The present invention relates to an intake air control device that controls intake air supplied to an internal combustion engine. Specifically, the present invention relates to an intake air control device that is formed of resin.

BACKGROUND OF THE INVENTION

A throttle body is mounted to a fixed member, such as an intake manifold of an internal combustion engine. The fixed member has a connecting portion such as a connecting face that may be varied in dimension due to manufacturing tolerance or aging. A conventional throttle valve has a cylindrical portion forming an intake air passage. The cylindrical portion may deform due to strain arising in the fixed member.

Accordingly, a shut off position of a conventional throttle valve is set at a position in which the throttle valve slightly opens relative to a position, in which the throttle valve makes contact with the cylindrical portion, considering a variation in dimension. In this structure, leakage of intake air increases in the shut off position. Besides, when the shut off position is set at a position, in which the throttle valve is further closed, seizure may occur between the throttle valve and the inner wall of the cylindrical portion. By contrast, when leakage of intake air is large in a condition, in which the throttle valve is in the shut off position, the engine may not be capable of adapting to a low idling standard of the engine for reduction in fuel consumption.

In addition, a throttle body of an intake air control device is conventionally formed of a metallic material such as aluminum. However, in recent years, a throttle body is formed of resin for reduction in cost and weight.

The resinous throttle body is apt to deform due to its material property. Accordingly, strain of the fixed member may be transmitted to a cylindrical member, which receives a throttle valve, via a flange in the throttle body, and the cylindrical member may be deformed. Here, the flange of the throttle body is a sealing collar portion that includes multiple fixed portions to be connected to the fixed member. When the cylindrical member deforms, leakage of intake air may increase, and seizure may occur between the throttle valve and the inner surface of the cylindrical portion.

According to conventional structures disclosed in JP-A-10-280981, JP-A-11-013562, and JP-A-11-062739, as shown in FIG. 13, a thin wall portion J5, which is a low rigidity portion for absorbing strain, is provided between a fixed portion J2 and a cylindrical portion J4. The fixed portion J2 is fixed to the fixed member using a securing member such as a bolt and a screw J3. When strain is transmitted from the connecting portion of the securing member J3 to the fixed portion J2, the thin wall portion J5 is deformed, so that the strain is restricted from being transmitted to the cylindrical portion J4.

However, the thin wall portion J5 can be formed to be only a small portion between the fixed portion J2 and the cylindrical portion J4. Accordingly, the thin wall portion J5 may not sufficiently absorb strain. Therefore, strain transmitted to the fixed portion J2 may be further transmitted to the cylindrical portion J4 via the thin wall portion J5. As a result, the cylindrical portion J4 may be deformed.

SUMMARY OF THE INVENTION

In view of the foregoing problems, it is an object of the present invention to produce an intake air control device that has a structure, in which a path, through which strain is transmitted from a fixed portion to a cylindrical portion, is extended to further absorb strain, so that the cylindrical portion is further restricted from being deformed.

According to the present invention, an intake air control device, which is mounted to a fixed member, includes a throttle body and a throttle valve. The throttle body defines an intake air passage. The throttle valve is rotatably supported in the throttle body. The throttle valve controls an amount of intake air flowing through the intake air passage. The throttle body includes a cylindrical portion, multiple fixed portions, and a strain absorbing portion. The cylindrical portion defines the intake air passage that accommodates the throttle valve. The fixed portions are connected to the fixed member. The strain absorbing portion connects the cylindrical portion with the fixed portions. The strain absorbing portion absorbs displacement arising in the fixed portions. The strain absorbing portion is a deformable connecting arm that connects to the cylindrical portion in a location, which is apart from a radially inner periphery of the fixed portions.

The intake air control device further includes a flange that includes the fixed portions. The strain absorbing portion is the flange. The flange connects to the cylindrical portion via a portion between the fixed portions.

Alternatively, the intake air control device includes a flange that includes the fixed portions. The strain absorbing portion includes the flange and an axial arm. The axial arm extends in the axial direction of the cylindrical portion from a portion of the flange that is arranged between the fixed portions. The axial arm connects to the cylindrical portion.

The cylindrical portion, the fixed portions, and the strain absorbing portion are integrally formed of resin.

The intake air control device further includes multiple bolts, multiple washers, and a compositely fixed member. The bolts include bolt heads, which are fixed to the fixed portions. The washers are inserted between the bolt heads and the fixed portions. The compositely fixed member is fixed compositely with the fixed portions using the bolts. The throttle body defines a gap forming recession that is arranged between the fixed portions and the cylindrical portion. The gap forming recession restricts the bolt heads, the washers, and the compositely fixed member from interfering with the cylindrical portion other than via the strain absorbing portion.

The throttle body includes a flange, which is in a ring shape, outwardly protruding from the cylindrical portion in the radial direction of the cylindrical portion. The flange includes the fixed portions, through which the bolts are inserted in the axial direction of the cylindrical portion. The flange has a slit that penetrates the flange in the axial direction of the cylindrical portion. The slit is arranged on the radially inner side of the fixed portions. The slit extends in the circumferential direction of the cylindrical portion.

The flange includes a connecting member that connects an outer flange of the flange on the outer side of the slit with the cylindrical portion via a portion between the fixed portions. The strain absorbing portion is constructed of the outer flange on the outer side of the slit and the connecting member. The flange has an inner flange on the inner side of the slit. The inner flange has a flange face that is located on a side in the vicinity of the bolt heads secured to the fixed portions. The gap forming recession is defined with the flange face of the inner flange and seating surfaces of the bolt heads at least in the vicinity of the fixed portions. The flange face of the inner flange is displaced to the opposite side of the bolt heads with respect to the seating surfaces of the bolt heads.

BRIEF DESCRIPTION OF THE DRAWINGS

The above and other objects, features and advantages of the present invention will become more apparent from the following detailed description made with reference to the accompanying drawings. In the drawings.

Figure 1:
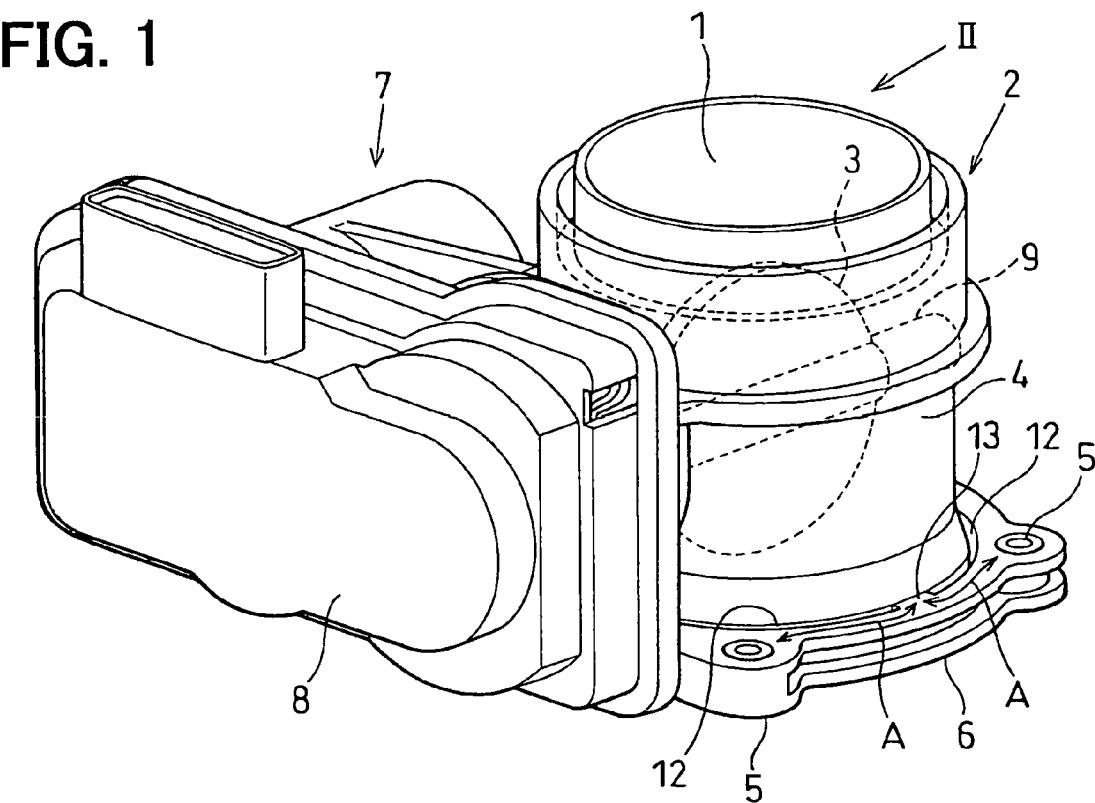
FIG. 1 is a perspective view showing an intake air control device according to a first embodiment of the present invention.
Figure 2:
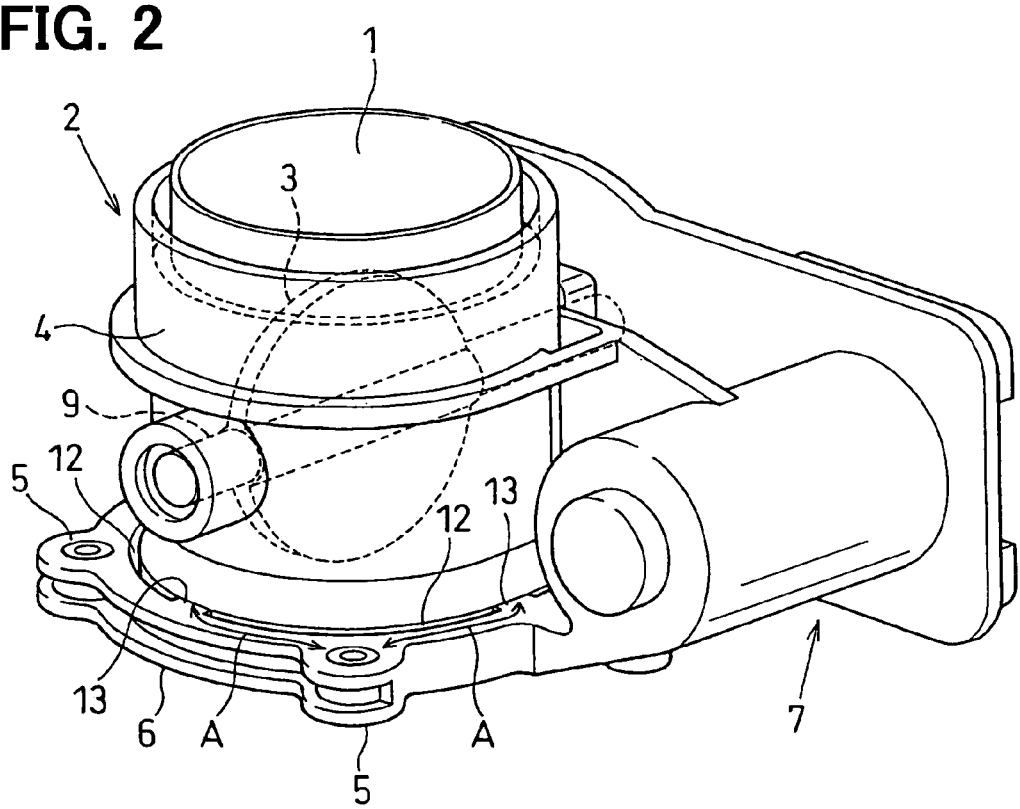
FIG. 2 is a perspective view showing the intake air control device when being viewed from the arrow II in FIG. 1.

DETAILED DESCRIPTION OF PREFERRED EMBODIMENTS (First Embodiment)

As shown in FIGS. 1 to 4, an intake air control device is constructed of a resinous throttle body 2 and a throttle valve 3. The resinous throttle body 2 internally forms an intake air passage 1. The throttle valve 3 is rotatably supported in the throttle body 2 to control an amount of intake air passing through the intake air passage 1.

The resinous throttle body 2 is integrally formed of a resinous material such as polyphenylene or polyamide with a cylindrical portion (bore) 4, a flange 6, and a driving device receiving portion 7. The cylindrical portion 4 has the intake air passage 1, in which the throttle valve 3 is received. The flange 6 includes multiple fixed portions 5 that are connected to a fixed member such as an intake manifold (FIG. 11B) M. The flange 6 includes four of the fixed portions 5 in this embodiment. The driving device receiving portion 7 accommodates driving devices of the throttle valve 3 such as an electric motor, gears, a return spring, and an angular sensor of the throttle valve 3 (not shown). The driving device receiving portion 7 has an opening (assembled opening) that is provided with a cover 8.

The throttle valve 3 is a butterfly type valve that rotates integrally with a throttle shaft 9 (rotation axis) that is rotatably supported by the cylindrical portion 4, so that the throttle valve 3 controls an amount of intake air that flows through the intake air passage 1. The intake air passage 1 is formed in the cylindrical portion 4 that surrounds the throttle valve 3.

The throttle shaft 9 is rotated by the electric motor via gears, and is controlled in angle. The electric motor is controlled by an ECU (engine control unit, not shown) in angle. The ECU calculates opening degree of the throttle valve in accordance with a position of the accelerator pedal, which is operated by a driver. Thereby, the ECU controls an amount of electricity to control the throttle valve such that an angular position, which is detected by the angular sensor of the throttle valve 3, coincides with the opening degree of the throttle valve, which is calculated by the ECU.

That is, the throttle valve 3 is controlled in angular position using the electric motor such that the angular position of the throttle valve 3 becomes the throttle opening degree calculated by the ECU. Thereby, the throttle valve 3 controls the amount of intake air flowing through the intake air passage 1.

Next, a structure of the throttle body is described.

The flange 6 of the throttle body 2 is a sealing collar that is fixed to the intake manifold M (FIG. 11B), and is connected to a connecting face on the side of the intake manifold M.

The flange 6 includes four of the fixed portions 5 that are fixed to four fixed places formed in the surface of the intake manifold M. Specifically, the fixed portions 5 are mounting portions of bolts (fixing members) 10. The bolts 10 are respectively inserted into the fixed portions 5 of the flange 6, and are respectively screwed into the fixed places (screwing holes) of the intake manifold M, so that the throttle body 2 is fixed to the intake manifold M. Metallic cylinders 11 (FIG. 4A) are respectively insert formed in the resinous fixed portions 5 to reinforce the fixed portions 5, so that the resinous body is restricted from being damaged due to screwing force of the bolts 10.

Here, the connecting places and the connecting face on the side of the intake manifold M may be deformed due to manufacturing tolerance and aging caused by thermal variation or the like. Specifically, when the intake manifold M is also formed of resin, the connecting face of the intake manifold M may be warped, and the connecting places of the bolts 10 on the side of the intake manifold M may be also displaced.

The resinous throttle body 2 is apt to be deformed due to the material property. Accordingly, when the connecting places on the side of the intake manifold M are displaced with respect to the predetermined places, the position of the fixed portions 5 may be also displaced. The displacement, i.e., strain is transmitted to the cylindrical portion 4 via the flange 6, and as a result, the cylindrical portion 4 may deform.

Therefore, in this embodiment, a strain absorbing portion A is provided to a portion via which the cylindrical portion 4 is connected to the fixed portions 5, so that displacement, which is transmitted from the intake manifold M to the fixed portions 5, is absorbed in the strain absorbing portion A. The strain absorbing portion A is constructed of at least one connecting arm, which is capable of deforming. The strain absorbing portion A connects the fixed portions 5 with the cylindrical portion 4 at locations that are radially inwardly apart from the fixed portions 5.

Specifically, the strain absorbing portion A is the flange 6 that has the multiple fixed portions 5 in itself. The flange 6 connects with the cylindrical portion 4 via only segments of the flange 6. The only segments of the flange 6 are respectively arranged circumferentially midway of two of the fixed portions 5. That is, the segments of the flange 6, which extend from the fixed portions 5 to the cylindrical portion 4, become the at least one connecting arms.

Figure 3:
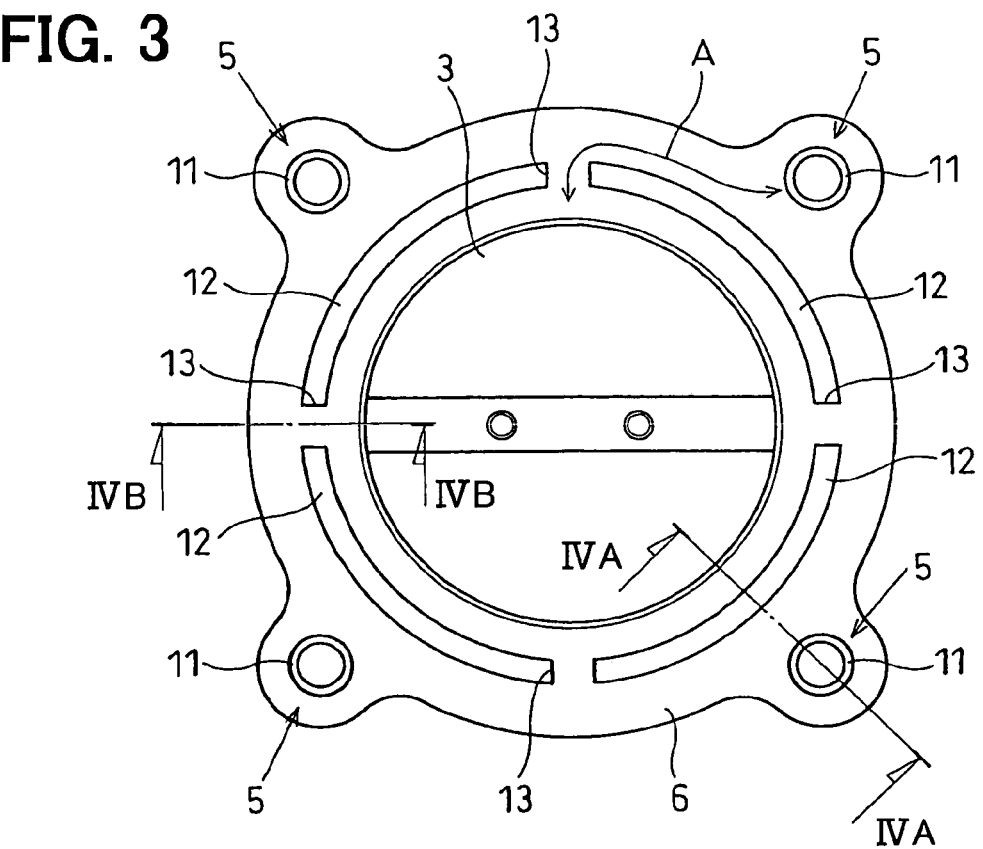
FIG. 3 is a bottom view showing the intake air control device according to the first embodiment.
Figure 5:
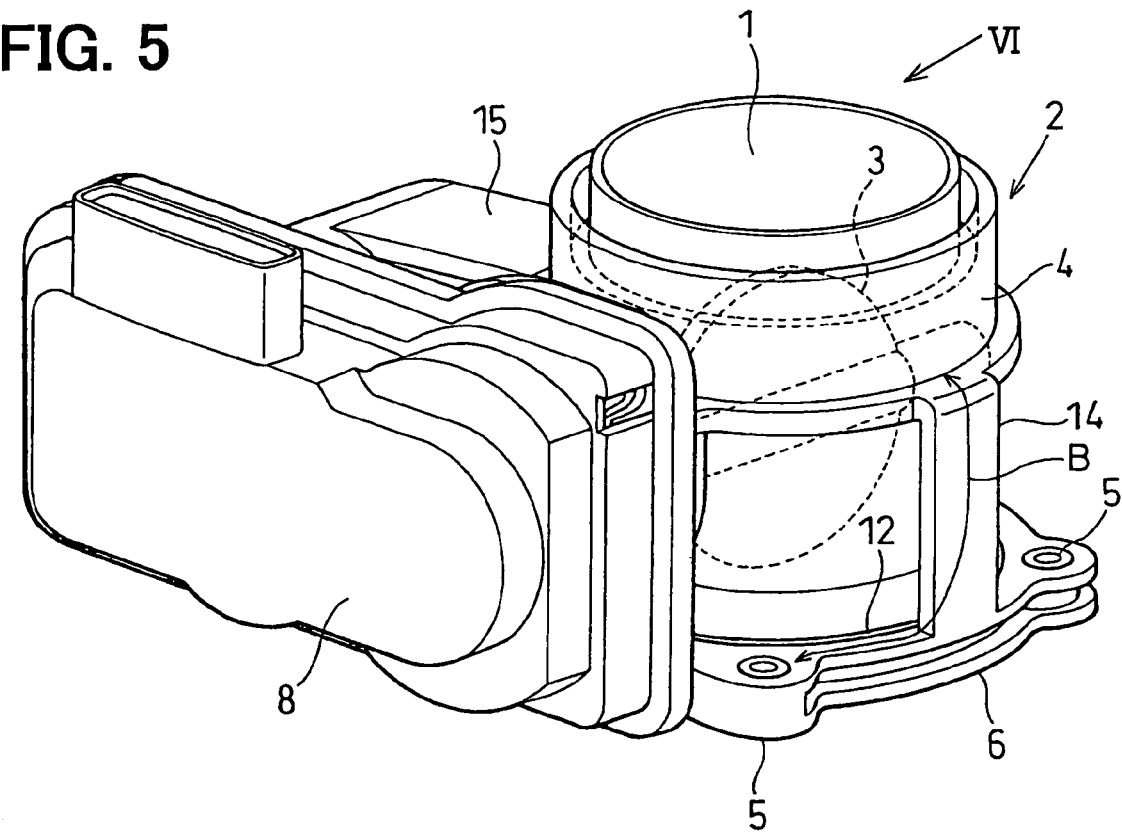
FIG. 5 is a perspective view showing an intake air control device according to a second embodiment of the present invention.
Figure 4A:
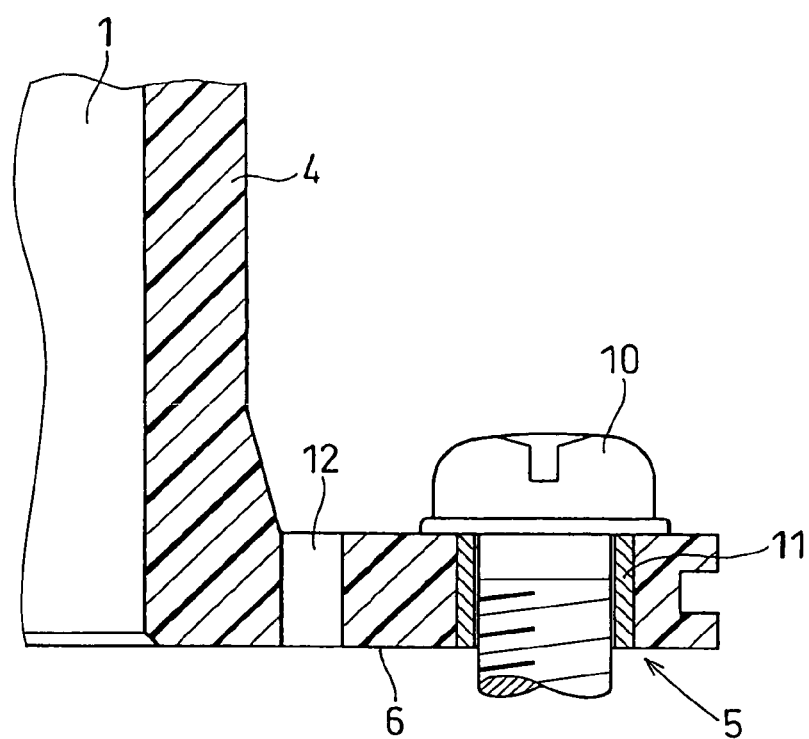
FIG. 4A is a cross-sectional side view showing the intake air control device taken along the line IVA—IVA in FIG. 3.
Figure 4B:
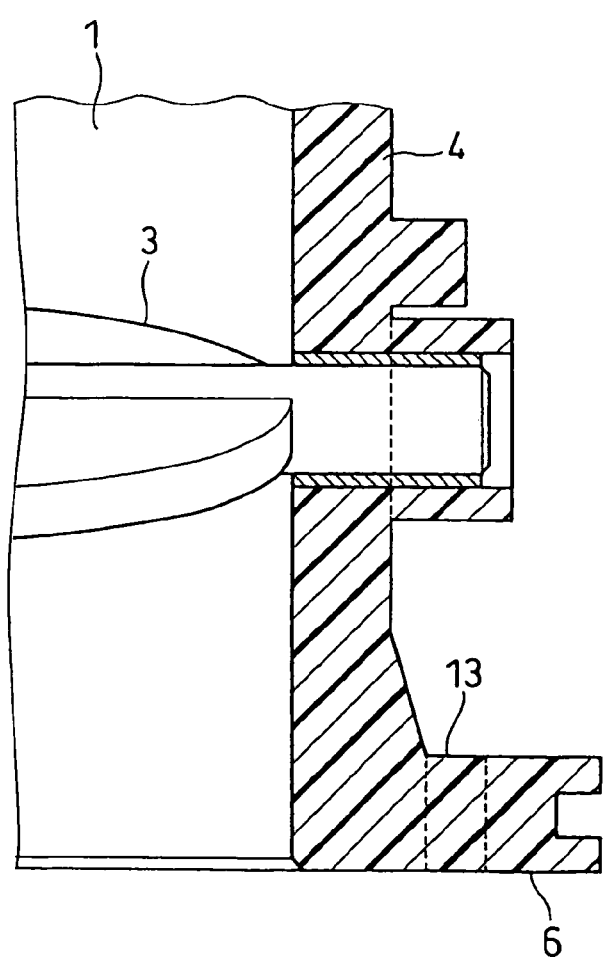
FIG. 4B is a cross-sectional side view showing the intake air control device taken along the line IVB—IVB in FIG. 3, according to the first embodiment.

Specifically, as shown in FIG. 3, slits (grooves, weight reducing holes) 12 are formed between the flange 6 and the cylindrical portion 4 such that the slits 12 penetrates the flange 6. Thereby, the flange 6 is connected to the cylindrical portion 4 only via connecting segments (connecting members) 13 that are respectively arranged midway of two of the fixed portions 5.

As described above, the intake air control device includes the strain absorbing portion A in the portion connecting the cylindrical portion 4 with the fixed portions 5 to absorb displacement of the fixed portions 5. The strain absorbing portion A is the deformable connecting arms that connect the fixed portions 5 with the cylindrical portion 4 at locations that are radially inwardly apart from the fixed portions 5.

Thereby, a path, through which strain is transmitted from the fixed portions 5 to the cylindrical portion 4, is further extended compared with a conventional structure, so that strain can be further absorbed. Therefore, the cylindrical portion 4 is further restricted from being deformed due to strain arising in the intake manifold M.

In addition, in this embodiment, the flange 6, which extends from the fixed portions 5 to the cylindrical portion 4, at least partially becomes the strain absorbing portion A in itself. Thereby, a member need not to be additionally provided to absorb strain, and the throttle valve 2 does not increase in size and weight.

Furthermore, in this embodiment, the positions of the fixed portions 5 are circumferentially displaced from the positions, in which the fixed portions 5 connect to the cylindrical portion 4, i.e., the positions of the connecting segments 13. Therefore, the strain absorbing portion A of the flange 6 is capable of absorbing strain arising in the axial direction of the cylindrical portion 4. Besides, the slits 12, i.e., gaps are formed between the flange 6 and the cylindrical portion 4 in the radial direction. Thereby, the strain absorbing portion A of the flange 6 is capable of absorbing strain arising in the radial direction of the cylindrical portion 4.

(Second Embodiment)

In the first embodiment, the throttle body 2 has the strain absorbing portion A that is formed only in the flange 6. By contrast, the throttle body 2 in this embodiment has the strain absorbing portion A, which is formed in the flange 6, and a strain absorbing portion B that is constructed of a part of the flange 6 and at least one axial arm (connecting member) 14.

As shown in FIGS. 5 to 8, the strain absorbing portion B is constructed of the flange (circumferential arm) 6 in itself and the axial arms 14. The flange 6 has slits 12 on the side of the cylindrical portion 4. The axial arms 14 respectively extend in the axial direction of the cylindrical portion 4 from portions of the flange 6, which are arranged circumferentially midway between two of the fixed portions 5. The axial arms 14 connect to the cylindrical portion 4. That is, a part of the flange 6, which is in a range from the fixed portions 5 to the axial arms 14, serves as a first connecting arm in itself. Besides, the axial arms 14, in which the connecting portions between the flange 6 and the cylindrical portion 4 are displaced along the axial direction, serve as second connecting arms.

Figure 7:
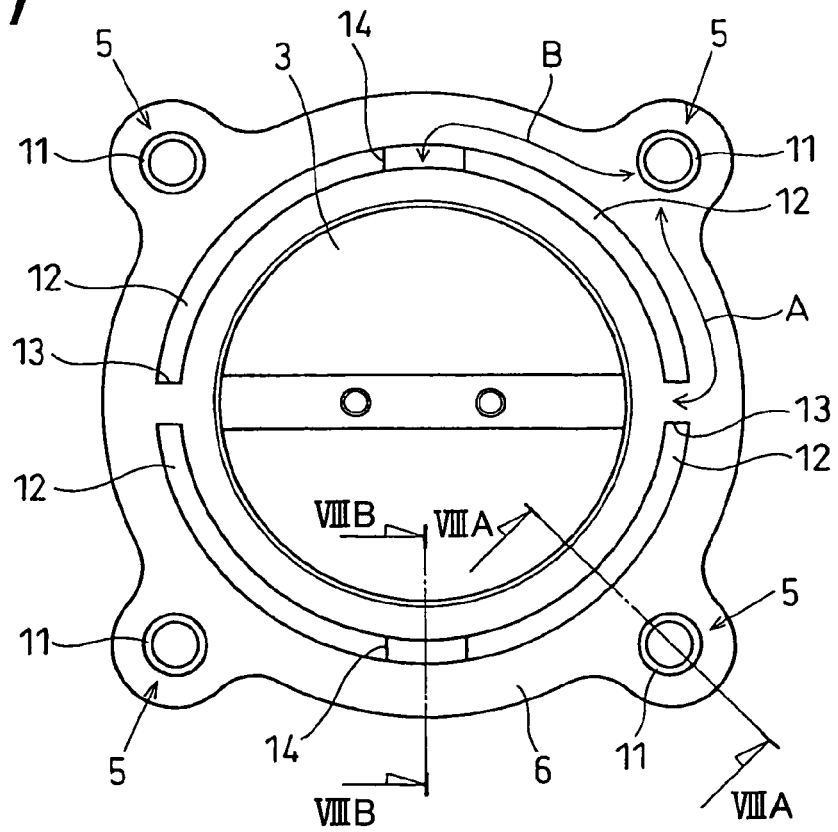
FIG. 7 is a bottom view showing the intake air control device according to the second embodiment.
Figure 8A:
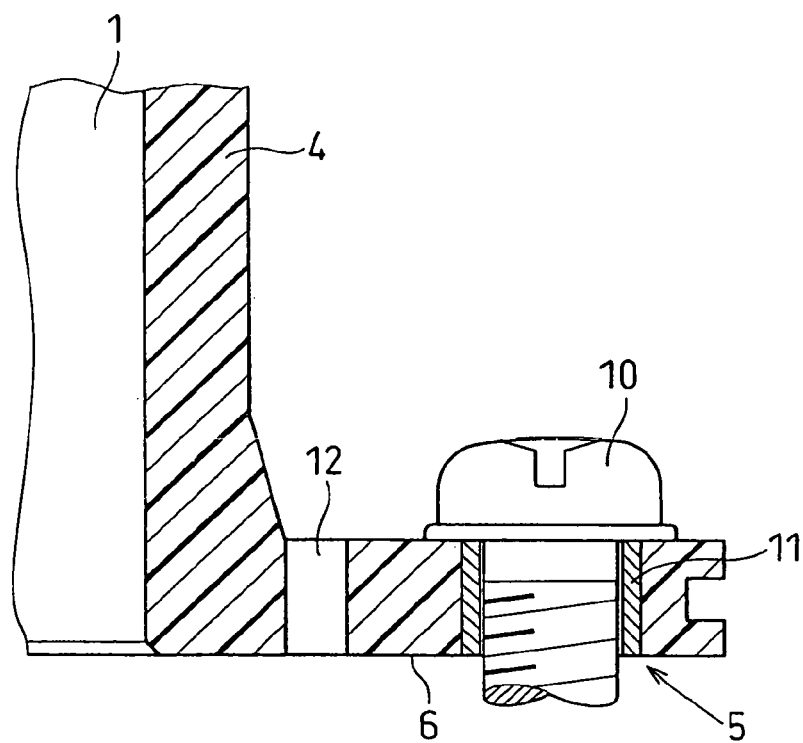
FIG. 8A is a cross-sectional side view showing the intake air control device taken along the line VIIIA—VIIIA in FIG. 7.
Figure 8B:
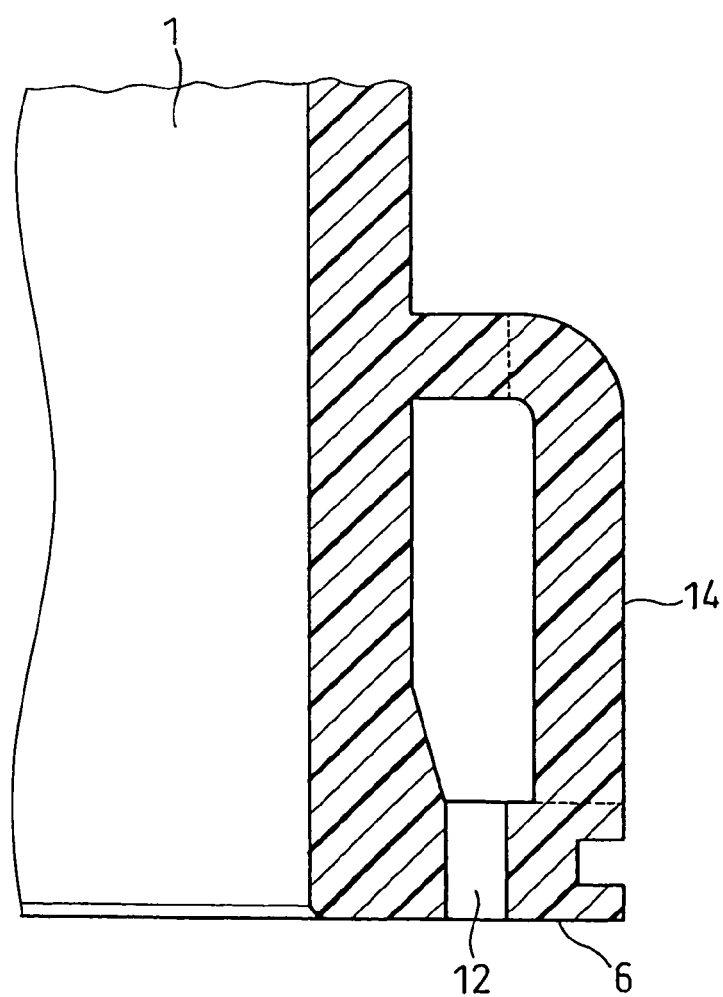
FIG. 8B is a cross-sectional side view showing the intake air control device taken along the line VIIIB—VIIIB in FIG. 7, according to the first embodiment.
Figure 9:
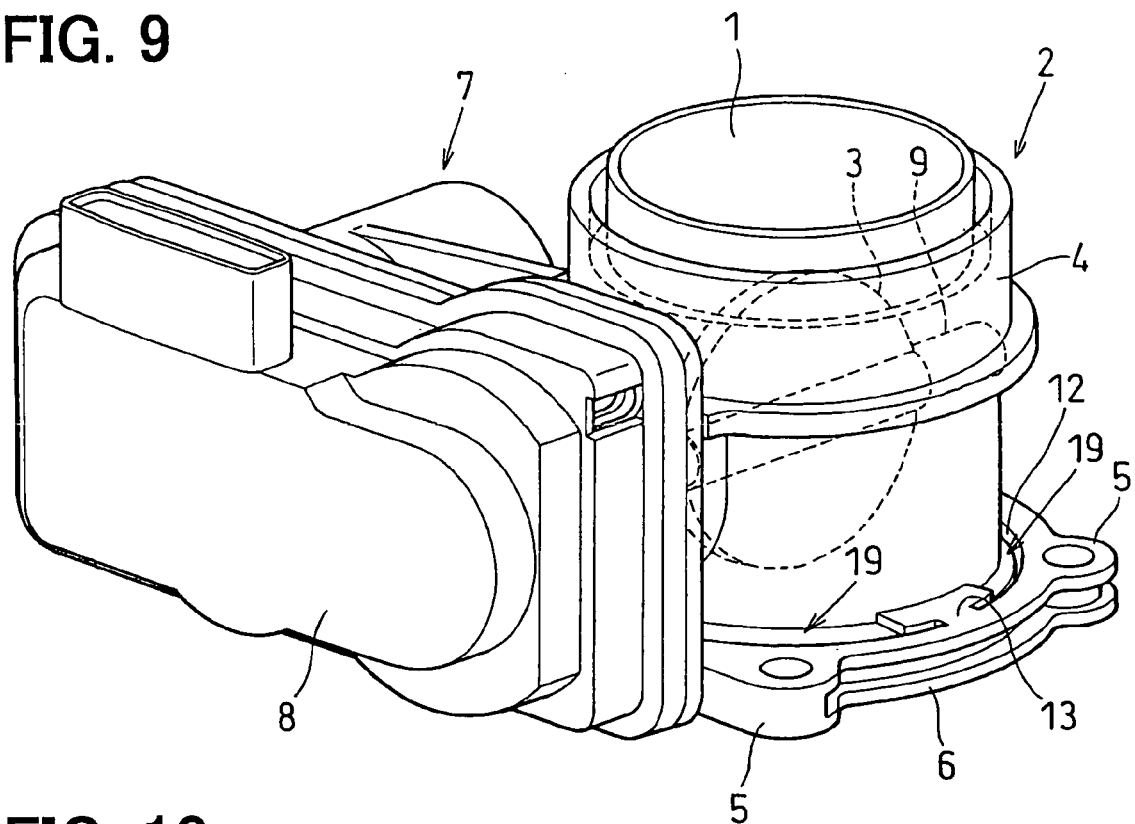
FIG. 9 is a perspective view showing an intake air control device according to a third embodiment of the present invention.
Figure 10:
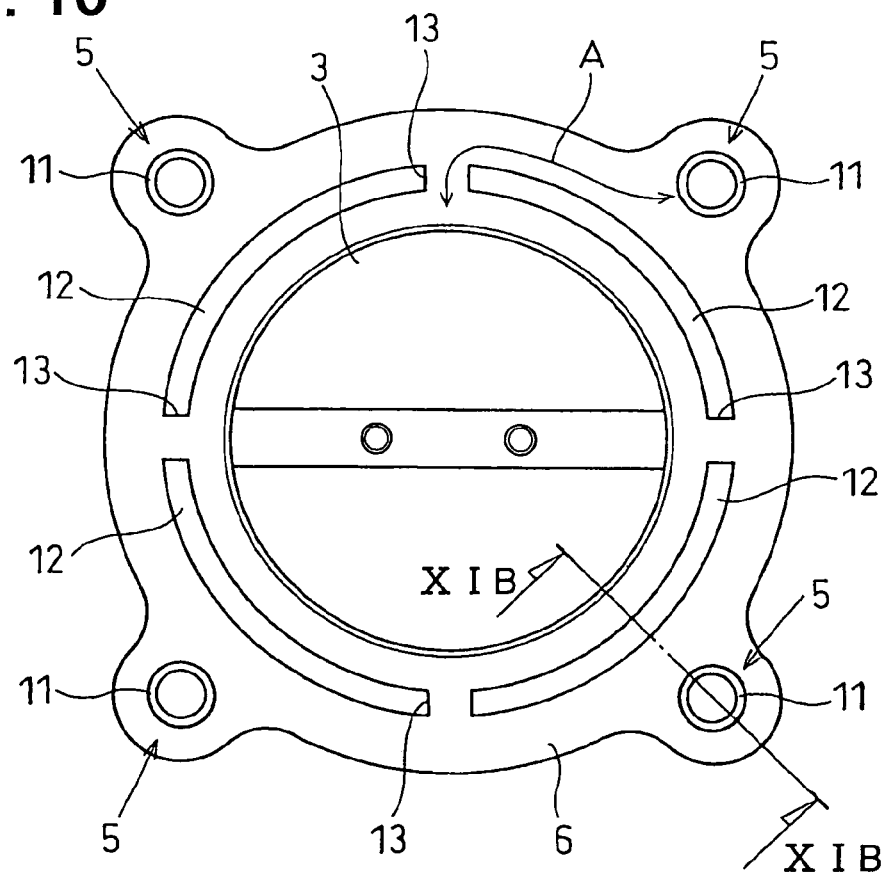
FIG. 10 is a bottom view showing the intake air control device according to the third embodiment.

As shown in FIGS. 7, 8, the connecting segments 13, which are described in the first embodiment, are not provided to the inside of the flange 6 at the portions, in which the axial arms 14 are provided to connect with the flange 6. The slits 12 are formed inside the flange 6 at the portions, in which the axial arms 14 are provided to the flange 6.

In this embodiment, the cylindrical portion 4, the flange 6, the axial arms 14, and the like are integrally formed of resin. Accordingly, the axial arms 14 can be provided to only two locations on the side of the motor housing and on the opposite side of the motor housing, due to a constraint of resin forming dies. However, when the axial arms 14 are provided additionally to the cylindrical portion 4, and the axial arms 14 are connected to the cylindrical portion 4, the axial arms 14 may be formed circumferentially all midways between the fixed portions 5, and the connecting segments 13 described in the first embodiment may be omitted. That is, the strain absorbing portion B may be constructed of the flange 6 and the axial arms 14, instead of the strain absorbing portion A described in the first embodiment. Here, the axial arms 14 may be components separate from the flange 6, or may be integrally formed with the flange 6.

Figure 6:
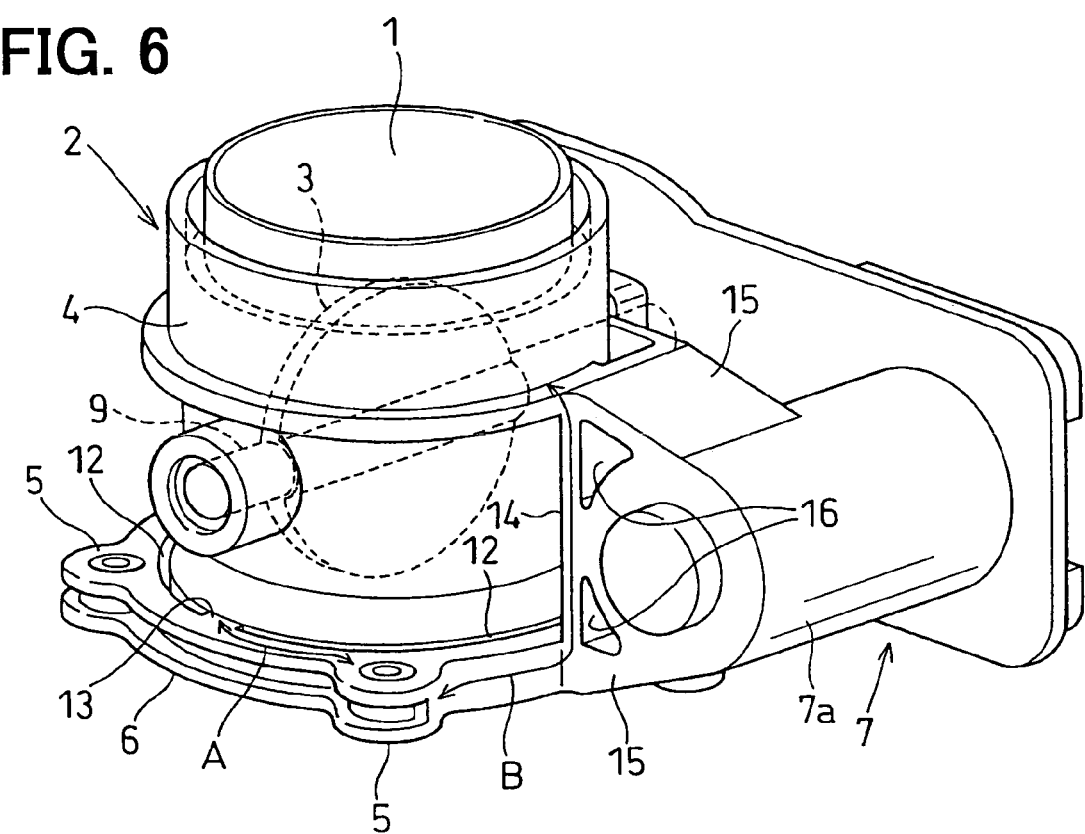
FIG. 6 is a perspective view showing the intake air control device when being viewed from the arrow VI in FIG. 5.

As shown in FIG. 6, the axial arm 14, which is on the side of a motor housing 7a, is connected with a supporting stay 15 of the motor housing 7a. The motor housing 7a is a part of the driving device receiving portion 7. Holes (weight reducing holes) 16 are formed between the axial arm 14 and the supporting stay 15 to reduce rigidity of the axial arm 14.

In the structure described in this embodiment, the intake air control device includes the strain absorbing portion B. The strain absorbing portion B is constructed of the first connecting arm, which is the flange 6 in itself, and the second arm, which is the at least one axial arm 14. Thereby, the path, through which strain is absorbed, is further extended compared with the structure, in which the intake air control device includes only the strain absorbing portion A, which is constructed of only the flange 6. Thus, strain can be further absorbed in the strain absorbing portion B, so that the cylindrical portion 4 can be further restricted from being deformed due to strain arising in the intake manifold M.

(Third Embodiment)

The structure of the third embodiment is described in accordance with FIGS. 9 to 11B.

The strain absorbing portion A is provided in the first embodiment, and the strain absorbing portions A, B are provided in the second embodiment.

Figure 11A:
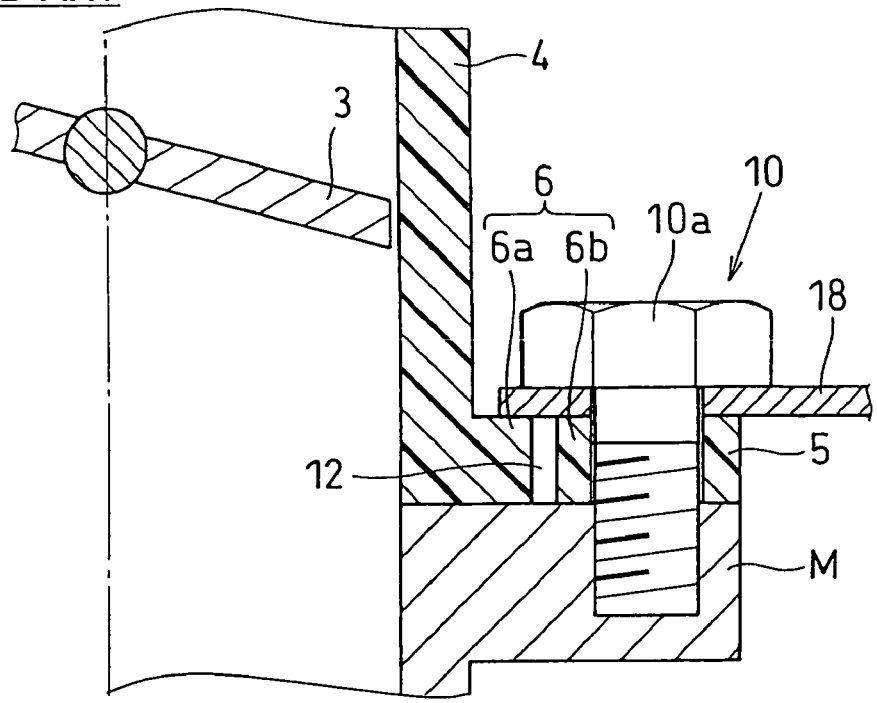
FIG. 11A is a cross-sectional side view showing an intake air control device according to a related art.

Even in the above structures, as shown in FIG. 11A, bolt heads 10a of bolts 10, washers 100, and a compositely fixed member 18 may directly interfere with the cylindrical portion 4 other than via the strain absorbing portion A or the strain absorbing portion B. That is, the bolt heads 10a, the washers 100, and the compositely fixed member 18 may directly interfere with the cylindrical portion 4 as well as the strain absorbing portion A or the strain absorbing portion B interfere with the cylindrical portion 4.

Specifically, the compositely fixed member 18 may interfere with an inner flange 6a, which is included in the flange 6, on the radially inner side of the slits 12. The bolts 10 secures the fixed portions 5 onto the intake manifold (fixed member) M. The washers 100 are respectively inserted between the bolt heads 10a and the fixed portions 5. The compositely fixed member 18 is fixed compositely with the fixed portions 5 using the bolts 10.

When the bolt heads 10a, the washers 100, and the compositely fixed member 18, which are fixed to the fixed portions 5, interfere with the cylindrical portion 4, an effect of absorbing strain using the strain absorbing portion A or the strain absorbing portion B may be impaired.

Figure 11B:
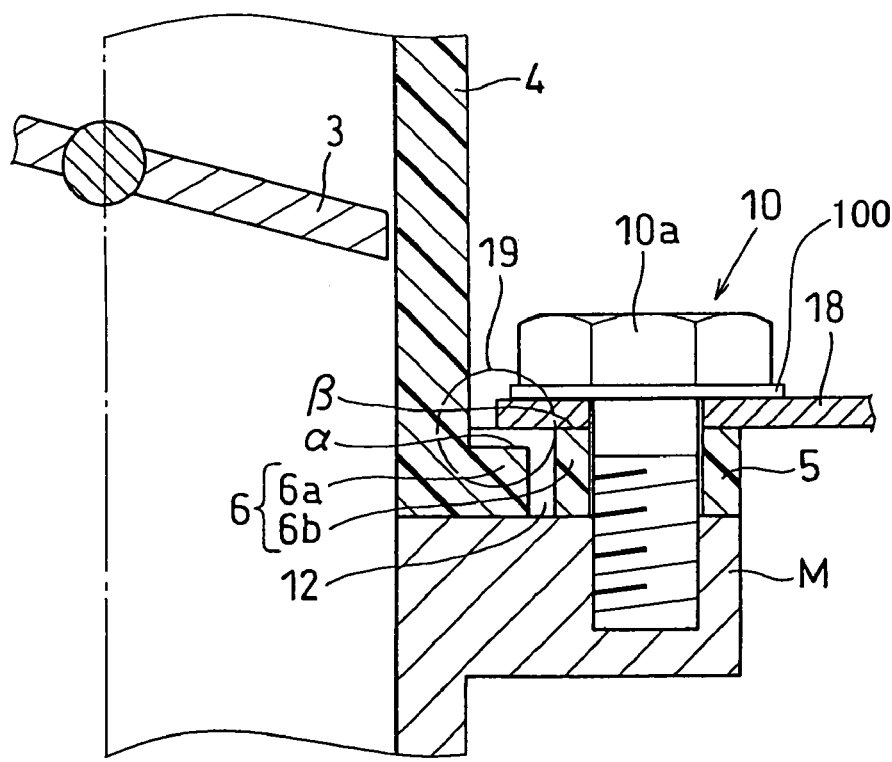
FIG. 11B is a cross-sectional side view showing the intake air control device taken along the line XIB—XIB in FIG. 10 according to the third embodiment.

As shown in FIG. 11B, in this embodiment, the throttle body 2 includes a gap forming recession 19 that is formed between the fixed portions 5 and the cylindrical portion 4 to solve the above problem. That is, the gap forming recession 19 restricts the bolt heads 10a, the washers 100, the compositely fixed member 18, and the like from interfering on the side of the cylindrical portion 4.

Here, as described in the first and second embodiments, the throttle body 2 includes the flange 6 that is in a ring shape radially outwardly protruding from the cylindrical portion 4. The flange 6 has multiple fixed portions 5, through which the bolts 10 are inserted in the axial direction of the cylindrical portion 4. The flange 6 has slits 12 and the connecting segments 13 and/or the axial arms 14. The slits 12 penetrate the flange 6 in the axial direction of the cylindrical portion 4 on the radially inner side of the fixed portions 5, and extend in the circumferential direction around the outer periphery of the cylindrical portion 4. The connecting segments 13 and/or the axial arms 14 connect an outer flange 6b of the flange 6 with the cylindrical portion 4 only in portions circumferentially midway between the fixed portions 5. The outer flange 6b is arranged on the radially outer side of the slits 12. The strain absorbing portion A and/or the strain absorbing portion B are constructed of the outer flange 6b, the connecting segments 13 and/or the axial arms 14.

The gap forming recession 19 is defined with a flange face a of the inner flange 6a and a seating surface P of each bolt head 10a in each fixed portion 5. The flange face a is located on the axially upper side of the inner flange 6a in FIG. 11B, i.e., on the side in the vicinity of the bolt head 10a secured to the fixed portions 5. Specifically, the flange face α of the inner flange 6a is displaced, i.e., offset to the opposite side of the bolt head 10a, i.e., to the lower side in FIG. 10B with respect to the seating surface β of each bolt head 10a at least in the vicinity of the fixed portions 5, so that the gap forming recession 19 is defined.

In this embodiment, the intake air control device has the gap forming recession 19, in which the flange face α, which is arranged axially in the vicinity of the bolt head 10a in the inner flange 6a, is shifted, i.e., moved to the opposite side of the bolt head 10a from the seating surface β of the bolt head 10a in the fixed portions 5. Thereby, the bolt heads 10a, the washers 100, the compositely fixed member 18, and the like do not interfere with the cylindrical portion 4. That is, the gap forming recession 19 restricts the bolt heads 10a, the washers 100, and the compositely fixed member 18 from directly interfering with the cylindrical portion 4, excluding interference via the strain absorbing portion A or the strain absorbing portion B.

Specifically, as referred to FIG. 11B, the compositely fixed member 18 and the like do not interfere with the cylindrical portion 4 without a constrain in the shape of the compositely fixed member 18.

Therefore, the intake air control device can be maintained in a high accuracy condition, without impairing an effect of absorbing strain using the strain absorbing portion A and/or the strain absorbing portion B described in the first and second embodiments.

The flange face α, which is axially in the vicinity of the bolt head 10a of the inner flange 6a, is displaced in an offset manner from the seating surface β of the bolt head 10a to the opposite side of the bolt head 10a. Thereby, the bolt heads 10a, the washers 100, the compositely fixed member 18, and the like can be restricted from arising interference with the cylindrical portion 4. Thus, the throttle body 2 can be restricted from being jumboized for evading interference in the internal structure.

VARIATION

Figure 12:
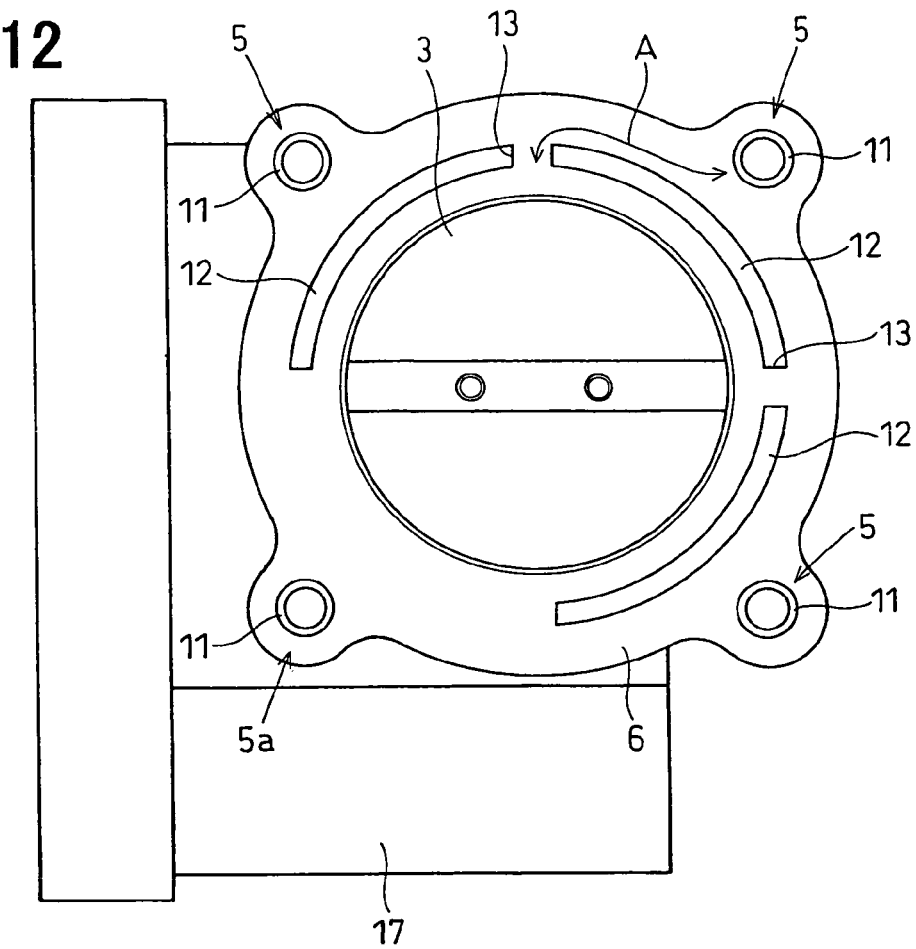
FIG. 12 is a bottom view showing an intake air control device according to a variation.
Figure 13:
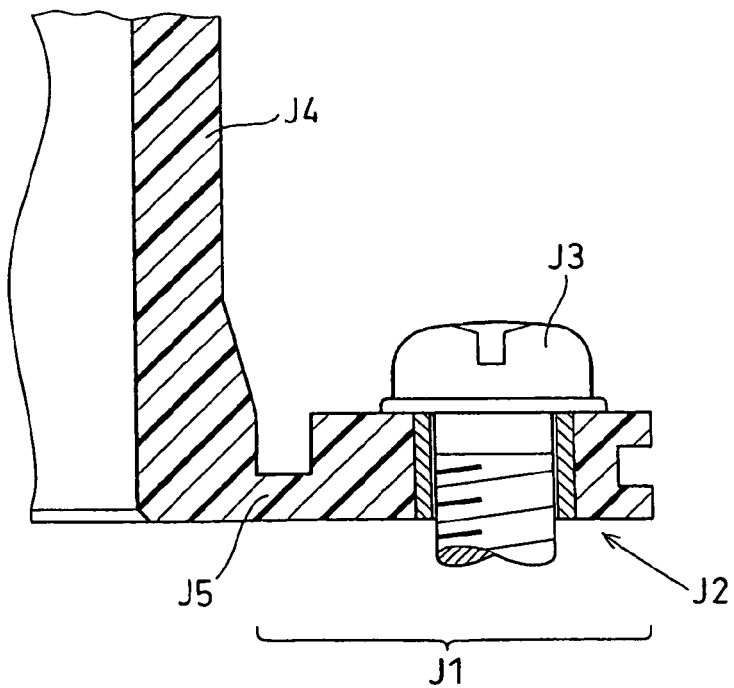
FIG. 13 is a cross-sectional side view showing an intake air control device according to a prior art.

In the above embodiments, the strain absorbing portion A, B is provided to all the portions between the cylindrical member 4 and the fixed portions 5. However, a portion, in which strain is not absorbed, and a portion, in which strain is absorbed, may be predetermined, and the strain absorbing portion A, B may be provided only to the portion, in which strain is absorbed. For example, as shown in FIG. 12, one of the slits 12 may be omitted only from a portion near a fixed portion 5a, which is in the vicinity of a motor 17 for rotating the throttle valve 3.

In this structure, mechanical strength between the flange 6 and the cylindrical portion 4 can be enhanced in the portion, in which strain is not absorbed. Thereby, the throttle body 2 can be rigidly assembled. In FIG. 12, a portion in the vicinity of the motor 17, which is a heavy component, can be enhanced in rigidity, so that the throttle body 2 can be enhanced in rigidity in itself, and the motor 17 can be reduced in vibration and resonance. Thereby, the intake air control device can be enhanced in durability.

The throttle valve 3 may be operated using a wire or a rod, instead of using power of the electric motor.

The cylindrical portion 4 and the flange 6 may be separated components, and the cylindrical portion 4 may be connected to the flange 6 using bonding or welding to construct the resinous throttle body 2, instead of integrally forming the throttle body 2.

The above structures in the embodiments can be combined as appropriate.

Various modifications and alternations may be diversely made to the above embodiments without departing from the spirit of the present invention.

What is claimed is:

1. An intake air control device that is mounted to a fixed member, the intake air control device comprising:
   a throttle body that defines an intake air passage; and
   a throttle valve that is rotatably supported in the throttle body, the throttle valve controlling an amount of intake air flowing through the intake air passage,
   wherein the throttle body includes a cylindrical portion, a plurality of fixed portions, and a strain absorbing portion, the cylindrical portion defines the intake air passage that accommodates the throttle valve, the plurality of fixed portions are connected to the fixed member, the strain absorbing portion connects the cylindrical portion with the plurality of fixed portions, the strain absorbing portion absorbing displacement arising in the plurality of fixed portions, the strain absorbing portion is a deformable connecting arm that has a connecting member that connects to the cylindrical portion, and the fixed portions are located in positions that are circumferentially displaced from a position at which the connecting member is located.

2. The intake air control device according to claim 1, further comprising:

a flange that includes the plurality of fixed portions, wherein the strain absorbing portion is the flange, and the flange connects to the cylindrical portion via a portion between the plurality of fixed portions.

3. An intake air control device according claim 1, wherein the cylindrical portion, the plurality of fixed portions, and the strain absorbing portion are integrally formed of resin.

4. An intake air control device that is mounted to a fixed member, the intake air control device comprising:

a throttle body that defines an intake air passage; and a throttle valve that is rotatably supported in the throttle body, the throttle valve controlling an amount of intake air flowing through the intake air passage, wherein the throttle body includes a cylindrical portion, a plurality of fixed portions, and a strain absorbing portion, the cylindrical portion defines the intake air passage that accommodates the throttle valve, the plurality of fixed portions are connected to the fixed member, the strain absorbing portion connects the cylindrical portion with the plurality of fixed portions, the strain absorbing portion absorbing displacement arising in the plurality of fixed portions, and he strain absorbing portion is a deformable connecting arm that connects to the cylindrical portion in a location, which is apart from a radially inner periphery of the plurality of fixed portions, and further comprising:

a flange that includes the plurality of fixed portions, wherein the strain absorbing portion includes the flange and an axial arm, the axial arm extends in an axial direction of the cylindrical portion from a portion of the flange that is arranged between the plurality of fixed portions, and the axial arm connects to the cylindrical portion.

5. The intake air control device according to claim 4, wherein the deformable connecting arm includes a connecting member that connects with the cylindrical portion, and the fixed portions are located in positions that are circumferentially displaced from a position at which the connecting member is located.

6. An intake air control device that is mounted to a fixed member, the intake air control device comprising:

a throttle body that defines an intake air passage; and a throttle valve that is rotatably supported in the throttle body, the throttle valve controlling an amount of intake air flowing through the intake air passage, wherein the throttle body includes a cylindrical portion, a plurality of fixed portions, and a strain absorbing portion, the cylindrical portion defines the intake air passage that accommodates the throttle valve, the plurality of fixed portions are connected to the fixed member, the strain absorbing portion connects the cylindrical portion with the plurality of fixed portions, the strain absorbing portion absorbing displacement arising in the plurality of fixed portions, and the strain absorbing portion is a deformable connecting arm that connects to the cylindrical portion in a location, which is apart from a radially inner periphery of the plurality of fixed portions, and further comprising:

a plurality of bolts that includes a plurality of bolt heads, which is fixed to the plurality of fixed portions;

a plurality of washers that is inserted between the plurality of bolt heads and the plurality of fixed portions; and a compositely fixed member that is fixed compositely with the plurality of fixed portions using the plurality of bolts, wherein the throttle body defines a gap forming recess that is arranged between the plurality of fixed portions and the cylindrical portion, and the gap forming recess restricts the plurality of bolt heads, the plurality of washers, and the compositely fixed member from interfering with the cylindrical portion other than via the strain absorbing portion.

7. The intake air control device according to claim 6, wherein the throttle body includes a flange, which is in a ring shape, outwardly protruding from the cylindrical portion in a radial direction of the cylindrical portion, the flange includes the plurality of fixed portions through which the plurality of bolts is inserted in the axial direction of the cylindrical portion, the flange defines a slit that penetrates the flange in an axial direction of the cylindrical portion, the slit being arranged on the radially inner side of the plurality of fixed portions, and extending in a circumferential direction of the cylindrical portion, the flange includes a connecting member that connects an outer flange of the flange on an outer side of the slit with the cylindrical portion via a portion between the plurality of fixed portions, the strain absorbing portion is constructed of the outer flange on the outer side of the slit and the connecting member, the flange has an inner flange on an inner side of the slit, the inner flange has a flange face that is located on a side in the vicinity of the plurality of bolt heads secured to the plurality of fixed portions, the gap forming recession is defined with the flange face of the inner flange and seating surfaces of the plurality of bolt heads at least in the vicinity of the plurality of fixed portions, and the flange face of the inner flange is displaced to an opposite side of the plurality of bolt heads with respect to the seating surfaces of the plurality of bolt heads.

8. The intake air control device according to claim 7, wherein the fixed portions are located in positions that are circumferentially displaced from a position at which the connecting member is located.

9. The intake air control device according to claim 6, wherein the deformable connecting arm includes a connecting member that connects with the cylindrical portion, and the fixed portions are located in positions that are circumferentially displaced from a position at which the connecting member is located.

* * * * *